United States Patent [19]

Smolensky et al.

[11] Patent Number: 5,180,486
[45] Date of Patent: Jan. 19, 1993

[54] POTENTIAL FLOW CENTRIFUGAL SEPARATOR SYSTEM FOR REMOVING SOLID PARTICULATES FROM A FLUID STREAM

[75] Inventors: Leo A. Smolensky, Concord; S. Ronald Wysk, Stow, both of Mass.

[73] Assignee: LSR Environmental Systems Company, Concord, Mass.

[21] Appl. No.: 442,505

[22] Filed: Nov. 28, 1989

[51] Int. Cl.⁵ .................. B01D 45/12; B01D 50/00
[52] U.S. Cl. ........................ 210/195.1; 55/201; 55/205; 55/340; 55/345; 210/259; 210/512.1
[58] Field of Search ............ 210/195.1, 259, 261, 210/262, 294, 512.1, 787, 788, 805, 806, 512.2, 194; 209/1, 144, 211; 55/1, 344, 345, 202, 459.1, 460; 414/35, 37, 42, 49, 900; 415/89

[56] References Cited

U.S. PATENT DOCUMENTS

| | | | |
|---|---|---|---|
| 1,023,082 | 4/1912 | Kluge | 55/345 |
| 1,845,358 | 2/1932 | Stebbins | 209/144 |
| 1,873,598 | 8/1932 | Jones | 210/259 |
| 1,978,802 | 10/1934 | Lissman | 209/144 |
| 2,082,690 | 6/1937 | Dorer | 494/49 |
| 3,095,369 | 6/1963 | Jager | 209/144 |
| 3,180,824 | 4/1965 | Corey | 210/259 |
| 3,667,600 | 6/1972 | Oi et al. | 209/144 |
| 4,001,121 | 1/1977 | Bielefeldt | 210/788 |
| 4,451,366 | 5/1984 | Smisson | 210/512.1 |
| 4,747,962 | 5/1988 | Smisson | 210/788 |

FOREIGN PATENT DOCUMENTS

| | | | |
|---|---|---|---|
| 929251 | 5/1982 | U.S.S.R. | 209/144 |
| 542063 | 12/1941 | United Kingdom | 55/460 |
| 722120 | 1/1955 | United Kingdom | 209/211 |
| 8606653 | 11/1986 | World Int. Prop. O. | 209/144 |

OTHER PUBLICATIONS

Article—"Atmospheric Pollution", Industrial and Engineering Chemistry, vol. 48, No. 12, pp. 105A, 106A and 108A, Dec. 1963, McCabe.
Fluid Mechanics, Potter et al, p. 352—"Inviscid Flows", Date of Publication Unknown.

Primary Examiner—Mary Lynn Theisen
Assistant Examiner—Joseph Drodge
Attorney, Agent, or Firm—Kriegsman & Kriegsman

[57] ABSTRACT

Solid particulates are removed from a solid particulate-laden fluid stream by passing the solid particulate laden fluid stream into a potential flow centrifugal separator which splits the potential solid particulate-laden fluid stream into a clean fluid stream and a concentrated solid particulate-laden fluid stream, passing the concentrated solid particulate-laden fluid stream into a solids collector which extracts solid particulates from the concentrated solid particulate-laden fluid stream leaving a fluid stream having a reduced solid particulate content, and conducting the fluid stream having a reduced solid particulate content back into the potential flow centrifugal separator for further processing.

15 Claims, 6 Drawing Sheets

POTENTIAL FLOW CENTRIFUGAL SEPARATOR SYSTEM FOR REMOVING SOLID PARTICULATES FROM A FLUID STREAM

BACKGROUND OF THE INVENTION

The present invention relates generally to materials treatment and more particularly to a method and apparatus for mechanically removing solid particulates from a fluid stream.

The discipline of separation and purification of solid materials is concerned with development and application of methods and processes in comminution, sorting and concentration or enrichment of primary or secondary raw materials. It encompasses a wide variety of processes including: crushing and milling, screening, sorting, classification, and separation of multiphase and multicomponent systems. The basic processes considered here include solid-gas, solid-liquid, and solid-solid-liquid systems.

Separation of solid particulates from gases or liquids depends on subjecting particles to a certain force which drives them to a collecting surface. The forces may be gravitational, inertial, physical or barrier, or diffusional. One mechanical type device that is commonly used to separate solid particulates from fluids is the cyclone collector. The cyclone collector operates on a centrifugal principle and is widely used for classification and for performing separations in solids-laden gases or slurries. In a cyclone collector the dirty feed stream enters through a tangential inlet into a cylindrical section, setting up a rotational motion and forming a vortex along the inside surface between the underflow and overflow. The stream is fed at sufficiently high velocity so that the centrifugal forces along the walls cause the particles to settle against the walls where they are directed to the underflow. Coincidentally, some fine particles can pass into a secondary vortex and out through the overflow.

Cyclone efficiency, defined at the underflow for each size fraction, can approach 100 percent for coarse particles and 0.0 percent for very fine sizes. Cyclone performance can be reliably predicted in most applications. However, its practical use is restricted to certain operating limits which must be maintained. One such limitation occurs when the solids are too small. Usually when the solids are less than 5 or 10 microns in diameter, separation efficiency for most materials is unsatisfactory. Another limit is that of the fluid and solids density. For good performance, the differential between solids and fluids specific gravities must be sufficient for good separation. Finally, highly viscous fluids do not produce sharp separations.

The present invention relates to an improved method and apparatus for removing very small particulates.

In U.S. Pat. No. 3,257,798 there is disclosed an exhaust treatment apparatus which includes a first cyclonic separator and a second cyclonic separator. The first cyclonic separator divides an exhaust gas mixture into a clean stream and a dirty stream while the second cyclonic separator removes solid particulates from the dirty gas stream emitted from the first cyclonic separator. The clean gas streams from both cyclonic separators are fed into a catalytic converter where they are purified and then exhausted.

In U.S. Pat. No. 3,254,478 there is disclosed a dust collecting apparatus which includes a cyclone type device and wherein the separated gas stream is recycled by an exhauster back to the inlet opening in the cyclone type device.

In U.S. Pat. Nos. 4,001,121, 4,298,359 and 4,460,391 there are disclosed tangential inertial separators wherein the clean gas is removed from the center of the cyclone vortex while the remaining gas and separated solids are exhausted tangentially for further cleanup.

Other known patents of interest are U.S. Pat. Nos. 1,660,865, 1,845,358, 1,845,567, 2,701,056, 2,818,935, 3,095,369 and 3,948,771. In FIGS. 20–103($b$) on page 20-87 of Perry's Chemical Engineer Handbook, Fifth Edition, there is shown a mechanical collector with recirculating flow. The collection efficiency of this unit is comparable with that of a cyclone. The centrifugal fields are higher than in a cyclone, but this is compensated by the higher intensity of the secondary flows, with their inherent reentrainment tendencies.

It is an object of this invention to provide a new and improved method and apparatus for removing solid particulates from a fluid stream.

It is another object of this invention to provide a new and improved method and apparatus for removing solid particulates from a fluid stream using inertial type devices.

It is a further object of this invention to provide a method and apparatus for removing solid particulates from a fluid stream using inertia type devices and which has a high separation efficiency, even for submicron size particles.

SUMMARY OF THE INVENTION

A method of removing solid particulates from a solid particulate-laden fluid stream according to the teachings of this invention comprises splitting the solid particulate-laden fluid stream into a clean fluid stream and a concentrated solid particulate-laden (i.e. dirty) fluid stream using a potential flow separator, extracting solid particulates from the concentrated solid particulate-laden fluid stream leaving a fluid stream having a reduced solid particulate content and mixing the fluid stream having a reduced solid particulate content back with the solid particulate-laden fluid stream being treated for further processing.

An apparatus for removing solid particulates from a solid particulate-laden fluid stream constructed according to the teachings of this invention comprises a potential flow separator means for splitting the particulate-laden fluid stream so formed into a clean fluid stream and a concentrated solid particulate-laden fluid stream, means separate from the potential flow separator means for extracting solid particulates from the concentrated solid particulate-laden fluid stream leaving a fluid stream having a reduced solid particulate content and means for mixing the fluid stream having a reduced solid particulate content back with the solid particulate-laden fluid stream being treated for further processing.

One advantage of the apparatus of the invention is that it can remove very fine particles from gas streams at high collection efficiency, a level of performance previously considered unattainable in conventional mechanical collectors.

Another advantage of the invention is that it contains all of the generic advantages of conventional mechanical collectors. There are no moving parts in the apparatus, which means that its maintenance requirements are low.

Still another advantage is that the apparatus does not require electrical or acoustic augmentation.

A further advantage of the invention is that it does not require special mechanical rappers for solids removal and is relatively insensitive to the electrical properties of the solids.

Yet still another advantage of the invention is that it is not susceptible to blinding problems that are frequently encountered in barrier filters.

Other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

The present invention is directed to the inertial separation of particulate matter in a fluid stream by first directing the fluid stream into a potential flow separator where it is split into a clean gas stream and a concentrated particulate-laden stream and then conducting the concentrated particle-laden stream into a solids collector for removal of at least a portion of the solids. The fluid stream emerging from the solids collector is mixed back into the system upstream of the separator by means of a recirculation device.

The apparatus of the invention is able to eliminate or significantly reduce the effect of some limitations generic to conventional centrifugal solids collectors, such as cyclones or hydrocyclones. More specifically, torroidal vortices which arise, in particular, in the end of cylindrical parts of cyclones and along their surfaces normal to the cyclone axis drastically reduce overall separation efficiencies. Torroidal vortices cause solids to become reentrained, and particulates which had already been separated from the fluid are swept back into the cleaned flow.

According to this invention, formation of torroidal vortices is practically avoided in a potential flow separator, in its region adjacent to the clean flow outlet. The potential flow separator does not have cyclone specific features promoting formation of secondary flows, such as flow U-turn within the separator, conical parts and surfaces normal to the separator axis situated in the immediate proximity to the clean flow outlet. The fact that the potential flow separator accomplishes the separating processes only, and not the solids collecting simplifies formation of potential flow in this component. Another important feature of the invention is the recirculation of a relatively low efficiency outlet flow from solids collector back into the separator.

Using the invention it is possible to remove particulate matter as small as 0.1 microns from a fluid stream.

Figure 1:
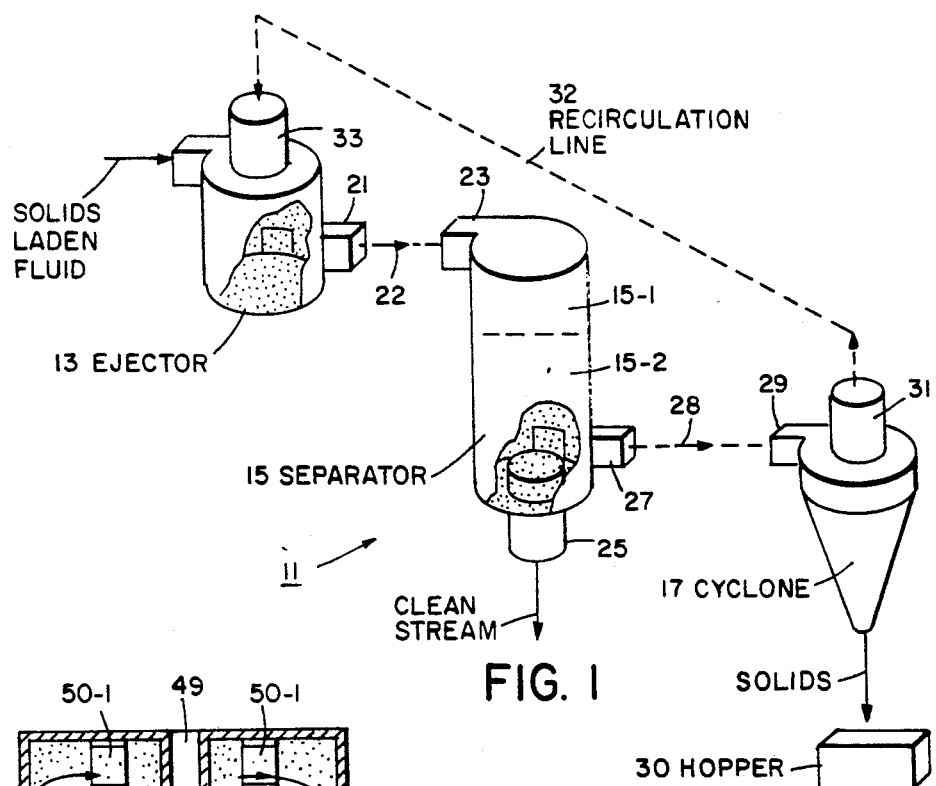
FIG. 1 is a simplified schematic diagram of one embodiment of the invention.

Referring now to FIG. 1 there is shown a simplified schematic diagram illustrating one construction and arrangement of system components and process flow according to the invention, the apparatus (i.e. system) being identified generally by reference numeral 11. For simplicity, the ductwork interconnecting the various components is not shown. The interconnecting ductwork is also not shown in some of the other embodiments hereinafter described in detail.

Apparatus 11 includes a centrifugal ejector recirculation device 13, a potential flow centrifugal separator 15 and a cyclonic solids collector 17.

Potential flow centrifugal separator 15 is cylindrically shaped vessel in which the clean flow opening is located inside the separator core far away from the inlet and recirculated flow outlet openings and surfaces normal to the separator axis to obtain high efficiencies and includes an upper portion or zone 15-1 and a lower portion or zone 15-2.

In the operation of apparatus 11 a solids-laden fluid stream, either gas or liquid, from a source (not shown) which is to be treated is conducted into tangential inlet 19 of recirculation device 13. The output stream from centrifugal recirculation device 13 emerging at tangential outlet 21 is directed through a line 22 into tangential inlet 23 of potential flow centrifugal separator 15. In separator 15 the fluid stream is arranged in portion 15-1 as a potential flow, free of stationary vortices or secondary flows, and then is split in portion 15-2 into a clean fluid stream and a concentrated solid particulate-laden fluid stream i.e. a dirty stream. The clean stream emerges from axial outlet 25 while the dirty stream emerges from tangential outlet 27. The dirty stream is fed by a line 28 into cyclone 17 through tangential inlet 29 where at least some of the solids are collected. The solids collected are stored in a hopper 30 for removal. The outlet stream from cyclone 17 emerging at outlet 31 is fed through a recirculation line 32 into ejector 13 through axial inlet 33 where it is combined with the main process solids-laden fluid inlet stream for recycling.

As can be seen, in potential flow centrifugal separator 15, axial outlet 25 is located away from inlet 23 and tangential outlet 27 and the surfaces normal to the separator axis so that very high separation efficiency can be achieved. High efficiency of the separator 15 predetermines high efficiency of the system even if collection efficiency of solids collector 17 is relatively low. For the system shown in FIG. 1, $$\epsilon = \frac{\epsilon_c \epsilon_s}{1 - \epsilon_s (1 - \epsilon_c)}$$

where $\epsilon, \epsilon_s \& \epsilon_c$ are separation or collection efficiencies for the system, separator, and solids collector, respectively. For example, if $\epsilon_s = 0.999$ and $\epsilon_c = 0.3$, the system collection efficiency $\epsilon$ still remains high at 0.997.

Figure 2:
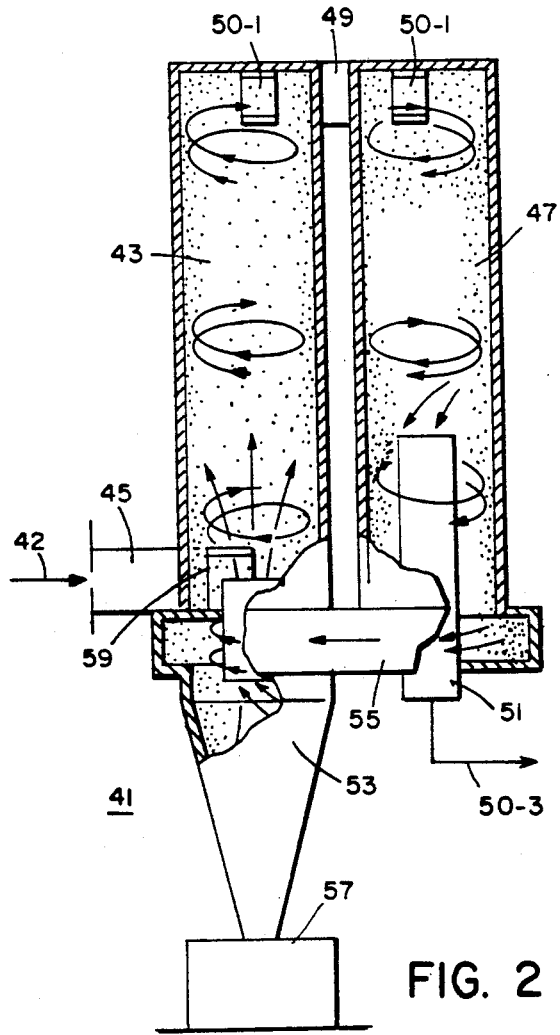
FIG. 2 is an elevation view partly broken away in section of another embodiment of the invention.

Referring now to FIG. 2, there is shown an elevation view partly broken away in section of an implemention of an apparatus according to this invention, the apparatus being identified by reference numeral 41.

In the FIG. 2 apparatus, a stream of solids-laden fluid 42 to be treated is directed into a centrifugal ejector recirculation device 43 through a tangential inlet duct 45. From centrifugal ejector 43 the fluid is fed into a potential flow centrifugal separator 47 through a duct 49 which connects the outlet 50-1 centrifugal ejector 43 to the inlet 50-2 centrifugal flow separator 47 and which is oriented tangentially to both centrifugal ejector 43 and centrifugal separator 47. In centrifugal separator 47 the stream is split into a central stream which is clean and an outer stream which is dirty. The clean stream 50-3 leaves centrifugal separator 47 through an axially disposed clean flow outlet duct 51 while the dirty stream (i.e. outer flow) is injected into a cyclone type solids collector 53 through a duct 55 which is common to and arranged tangentially to both centrifugal separator 47 and solids collector 53. Solid particulates extracted from the stream by the solids collector 53 are stored for removal in a hopper 57 located below solids collector 53 while partially cleaned stream containing particulates not extracted are returned to centrifugal ejector 43 through a feedback duct 59 which is axially oriented and common to both ejector 43 and solids collector 53.

As is apparent, the configuration shown in FIG. 2 does not use a blower, integral fan or pump to recirculate the flow. This allows the system to be employed in high temperature and/or corrosive atmospheres, perhaps immediately downstream of a combustor. For low temperature applications and non-corrosive atmospheres a blower or fan can be incorporated into the system for recirculation and the centrifugal ejector eliminated. The apparatus may be arranged as depicted in FIG. 3.

Figure 3:
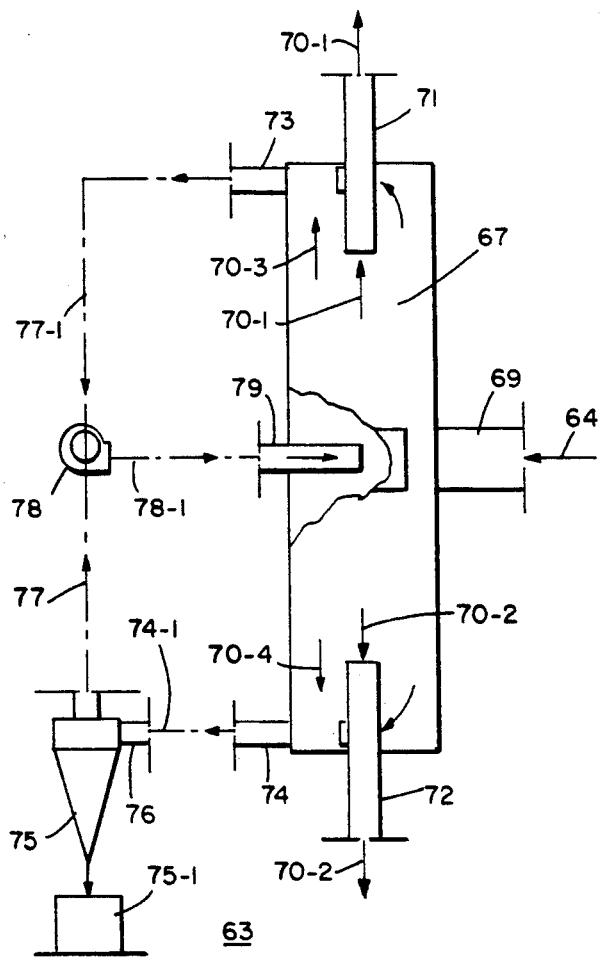
FIG. 3 is a simplified schematic diagram of another embodiment of the invention.

In the FIG. 3 apparatus identified generally by reference numeral 63 is shown. In apparatus 63, the flow 64 to be treated is introduced into potential flow centrifugal separator 67 through a tangential inlet duct 69 where it is split into clean streams 70-1 and 70-2 and dirty streams 70-3 and 70-4. The clean streams exit through axially located clean flow outlet duct 71 and 72 while the dirty streams exit through outlet ducts 73 and 74. The dirty streams exiting through duct 76 is conducted through a line 74-1 into cyclone solids collector 75 through a tangential duct 76. The solids collected by cyclone solids collector 75 are stored in hopper 75-1. The fluid output from cyclone 75 through a line 77 is fed into a blower 78. The dirty flow exiting from separator 67 through duct 73 is directly by line 77-1 into blower 78. The outlet stream from blower 78 is fed by line 78-1 into separator 67 through tangential flow feedback inlet 79 for recirculation.

Figure 4:
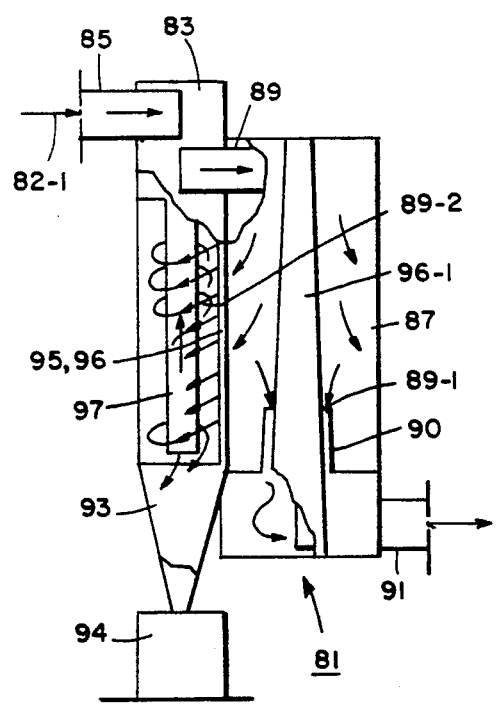
FIG. 4 is a schematic view partly broken away of another embodiment of the invention.

The cylindrical shape of a potential flow centrifugal separator as shown in FIGS. 1 through 3 minimizes the formation of torroidal vortices, which cause solids reentrainment. However, some solids reentrainment can also occur in a cylindrically shaped centrifugal separator from the turbulent pulsations in the zones adjacent to the separator walls. To reduce the effect of the pulsations, the peripheral jets in such a separator can be separated from the cleaned bulk flow, as the jets are laden with solids which can reach the separator walls. This is accomplished in apparatus 81 shown in FIG. 4, where the outlet for conducting the dirty stream from the separator to the cyclone is arranged as a slit situated along the side wall of the separator and facing a corresponding slit formed on the side wall of the cyclone.

Figure 4A:
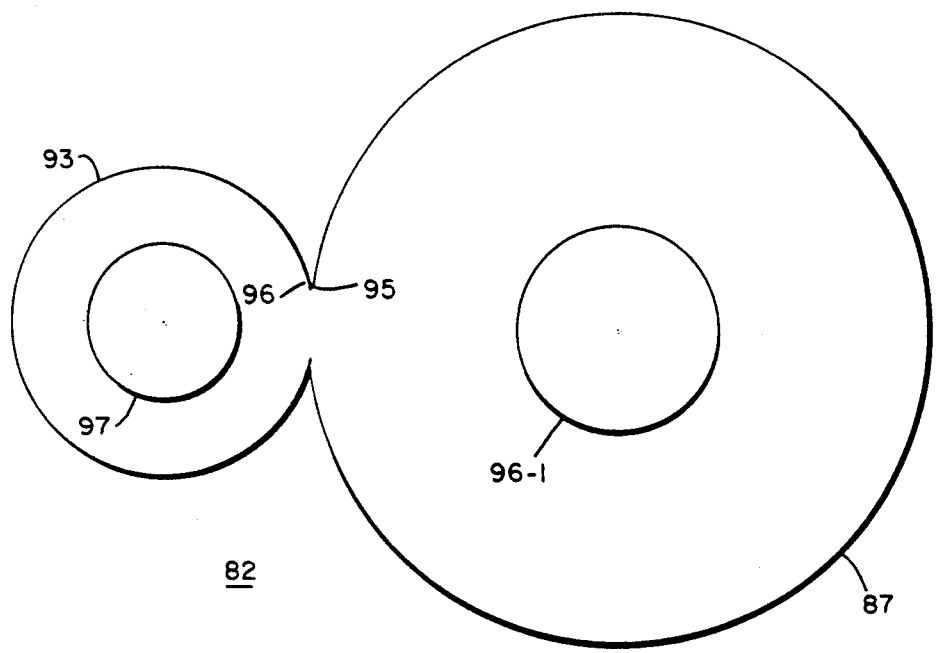
FIG. 4(a) is a section view taken along lines 4—4 in FIG. 4.

In apparatus 81, the fluid stream 82-1 to be treated enters ejector 83 through inlet 85 and then exits ejector 83 and enters separator 87 through a duct 89 where it is split into a clean stream 89-1, and a dirty stream 89-2. The clean stream 89-1 enters outlet 90 and exits through duct 91 while the dirty stream 89-2 passes into solids collector 93 through a slit 95 formed in the side wall of separator 87 which is aligned with a slit 96 in the side wall of solids collector 93 (See also FIG. 4(a)). A conically shaped impermeable wall 96-1 restricts flow within the core of separator 87 while maintaining constant axial velocities. Solids extracted in solids collector 93 are stored in hopper 94. The cleaned stream from solids collector 93 is fed back into ejector 83 through axial inlet 95 for recirculation.

Figure 5:
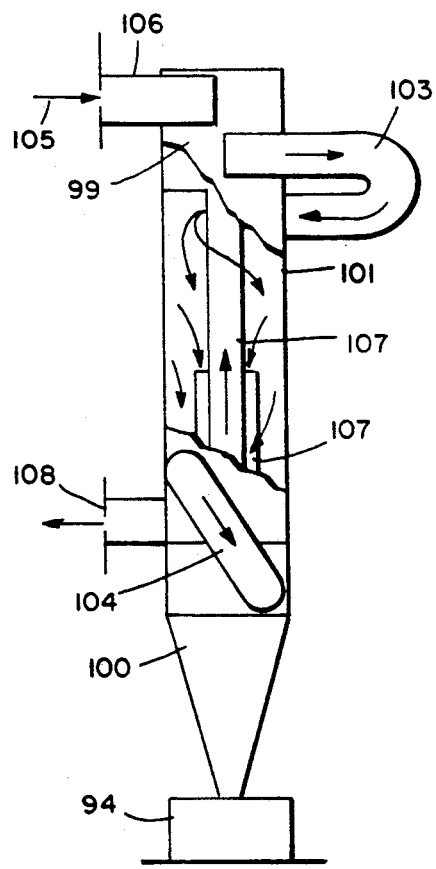
FIG. 5 is a schematic view partly broken away of another embodiment of the invention.

In FIG. 5 there is shown a system 98 where all of the major components are situated along a common axis. As can be seen, ejector 99 and solids collector 100 are placed above and below separator 101 respectively and axial line 102 of ejector 99 extends into separator 101. Flow U-turns are accomplished by ducts 103 and 104 which connect ejector 99 with separator 101, and separator 101 with solids collector 100, respectively. The streams 105 to be treated enters ejector 99 through inlet duct 106 while the cleaned stream produced in separator 101 enters inlet 107 and exits through outlet duct 108.

Figure 6:
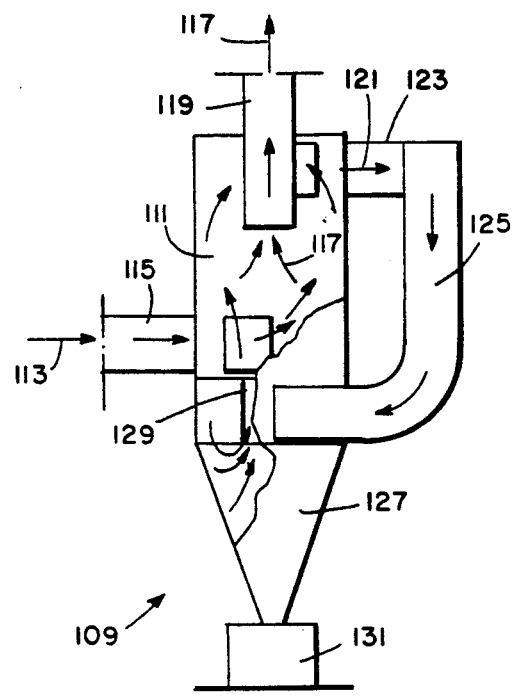
FIG. 6 is a schematic view partly broken away of another embodiment of the invention.

In apparatus 109 depicted in FIG. 6, the potential flow centrifugal separator and the flow ejector are combined in one cylindrical vessel 111, accomplishing the functions of both components. The flow 113 to be treated enters vessel 111 through inlet 115, the clean flow 117 exits through axial outlet 119. The dirty flow 121 is discharged from vessel 111 through outlet 123 and directed by tangential duct 125 to cyclone 127. The cleaned stream is conducted back into vessel 111 through duct 129. Solids collected are stored for removal in hopper 131. The advantage of this arrangement is that some duct connections are eliminated.

Figure 7:
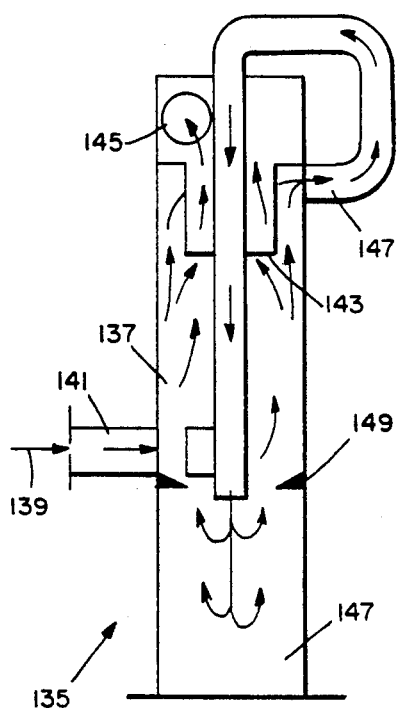
FIG. 7 is a schematic view of another embodiment of the invention.
Figure 8:
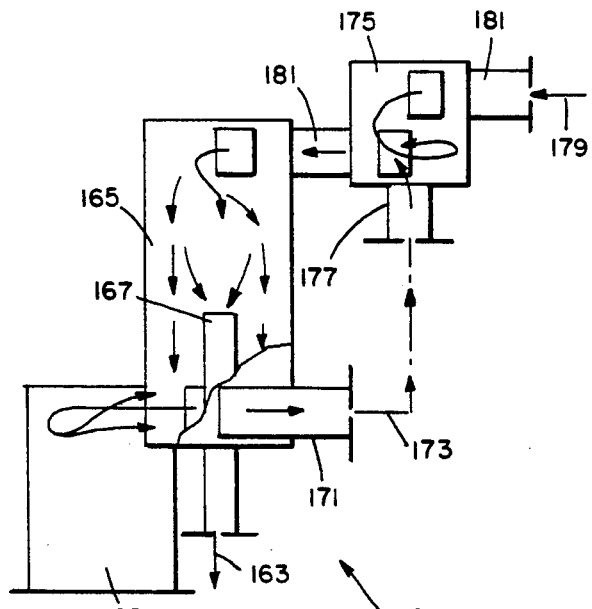
FIG. 8 is a schematic view partly broken away of another embodiment of the invention.

Disengagement of solids from the fluids can be accomplished not only by cyclones, but by any other type of solids collectors, such as louver, impingement, or gravity separators. FIG. 7 and 8 show two systems where the solids are injected into a hopper and are disengaged from the fluid flow by means of inertial force. These systems do not have solids separation efficiencies as high as ones employing cyclones, but they are simplier, more compact, and have lower power consumption.

The system 135 shown in FIG. 7, similar to the design in FIG. 6, employs a cylindrical vessel 137, which accomplishes the functions of both the flow separator and ejector. The stream 139 to be treated enters vessel 13 through tangential inlet duct 141. The clean flow passes up into duct 143 and exits through opening 145. A recirculation line 147 injects the peripheral (dirty) flow in vessel 137 downward in hopper 147 while the flow in vessel 111 is directed upward. The solids disengaged from the fluid flow are collected in hopper 147 which is located under vessel 137 and which is separated from hopper 147 by a partition 149 having a central opening 151.

In apparatus 161 shown in FIG. 8, the clean flow 163 in potential flow centrifugal separator 165 exits through axial outlet duct 167 while the peripheral fluid flow in potential flow centrifugal separator 165 is injected tangentially through a duct 165 into a hopper 169 which is coupled to separator 163. Solids disengaged from the peripheral fluid flow are collected in hopper 169 and the rest of the solids are recirculated by means of the separator peripheral flow through an outlet duct 171 and a recirculation line 173 back into an ejector 175 through an axial inlet 177. The inlet stream 179 to be treated is fed into ejector 175 through a tangential inlet duct 181. The outlet stream from ejector 172 is fed into separator 165 through common tangential inlet duct 181.

Figure 9:
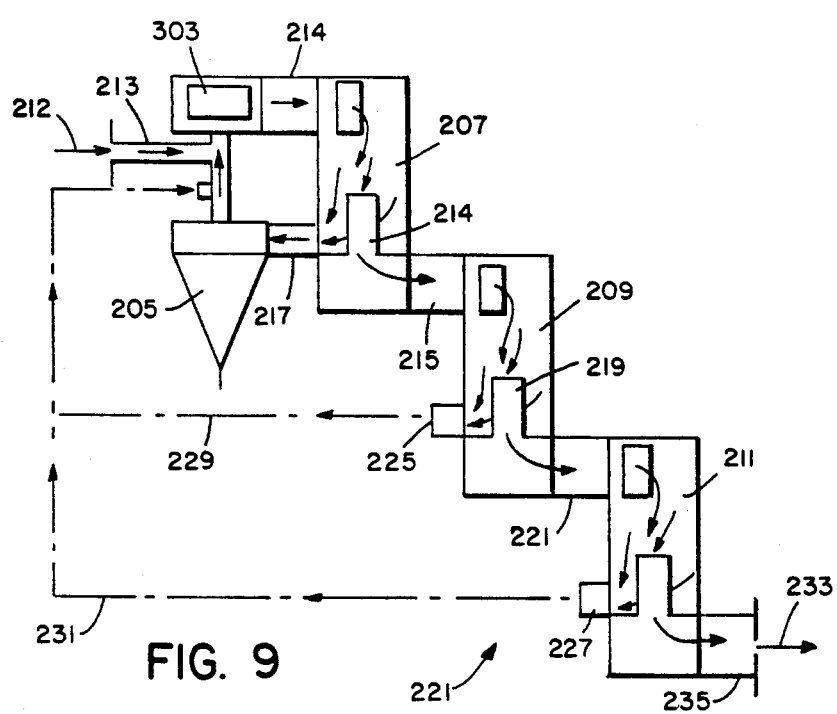
FIG. 9 is a a schematic view of another embodiment of the invention.

In FIG. 9 there is shown a system 201 which includes a blower 203, a cyclone type solids collector 205 and three potential flow centrifugal flow type separators 207, 209 and 211 arranged in series so that the clean stream from the first separator is cleaned two additional times. In operation, the fluid stream 212 to be treated enters inlet duct 213 and is fed by blower 203 through duct 214 into first centrifugal separator 207. The cleaned stream from separator 207 is fed out of outlet 214 into second separator 209 through duct 215 while the dirty stream is fed by tangential outlet duct 217 into solids collector 205. The cleaned stream from separator 209 exits through outlet 219 is fed through a duct 221 into third separator 211. The dirty stream from outlet 225 of separator 209 and the dirty stream from outlet 227 of separator 211 are conducted back into blower 203 through lines 229 and 231, respectively, along with the outlet stream from solids collector 205 for recirculation while the cleaned stream 233 from separator 211 is the clean stream outlet of the system and exits through outlet duct 235.

Figure 10:
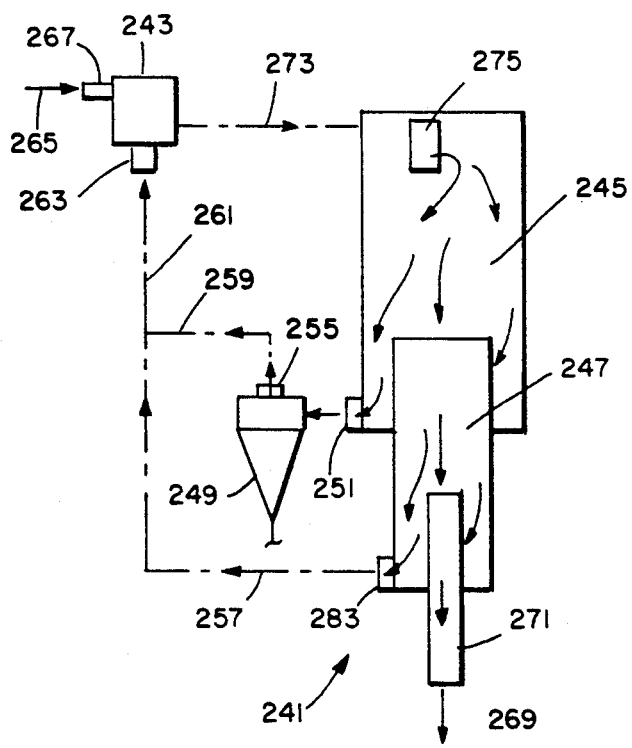
FIG. 10 is a schematic view of another embodiment of the invention.

In FIG. 10 there is shown a system 241 which includes an ejector 243, a first potential flow centrifugal type separator 245, a second potential flow centrifugal type separator 247 and a cyclonic solids collector 249, and wherein the axial cylindrically shaped clean stream outlet duct for the first separator is used as the vessel for the second separator. In use, the dirty stream from first separator 245 is fed through outlet 251 into solids collector 249 while the dirty stream from second separator 247 which exits through outlet 253 and the fluid stream from solids collector 229 from outlet 255 are conducted back through recirculation lines 257, 259 and 261 into ejector 243 through axial inlet 263 for recycling. The stream 265 being treated enters ejector 243 through inlet duct 267. The clean stream 269 exits through axial duct 271 and the outlet from ejector 243 is fed by a line 273 into the inlet opening 275 in separator 245.

Figure 11:
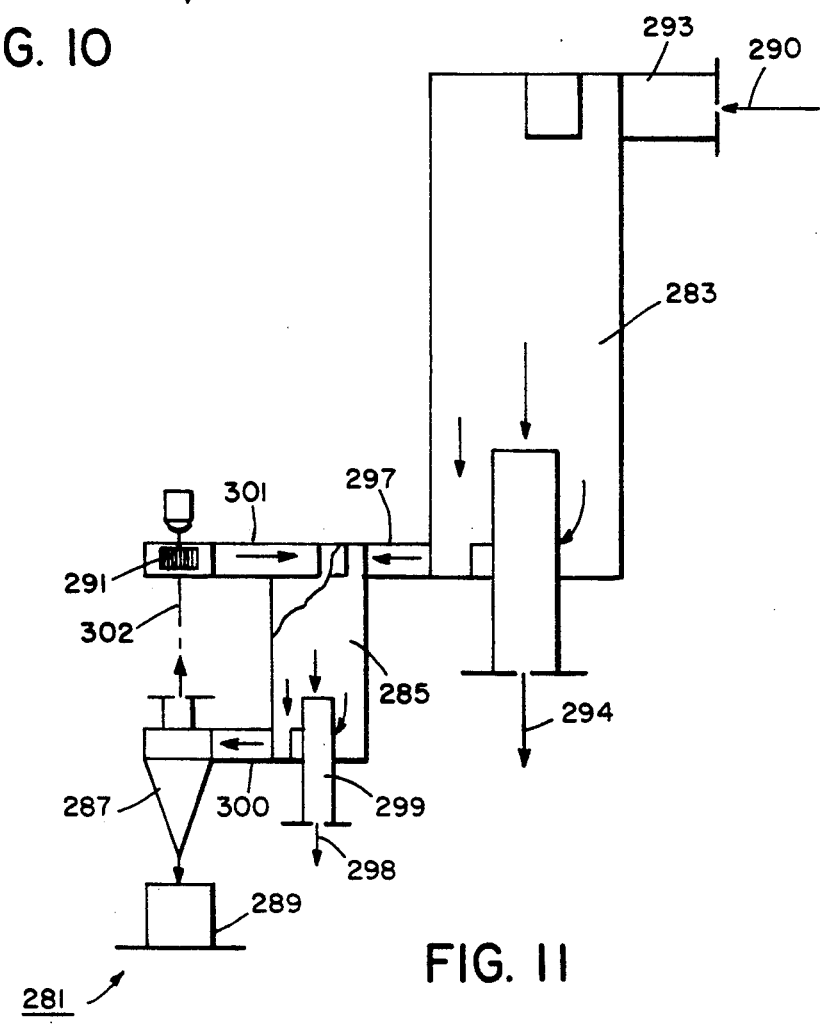
FIG. 11 is a schematic view of another embodiment of the invention.

In FIG. 11 there is shown a system 281 which includes a pair of potential flow centrifugal separators 283 and 285 arranged in series, a cyclonic solids collector 287, a hopper 289 and a blower 291. In operation, the fluid stream to be treated enters separator 283 through inlet duct 293. In separator 283 the stream is arranged as a potential flow and split into a clean stream and a dirty stream. The clean stream 294 exits through axial duct 295. The dirty stream is conducted into separator 285 through a duct 297 which serves as a tangential outlet for separator 283 and a tangential inlet for separator 285. In separator 285 the stream is arranged as a potential flow and split into a clean stream and a dirty stream. The clean stream 298 exits through axial duct 299. The dirty stream is conducted into cyclonic solids collector 287 through tangential duct 300 solids collected by solids collector 237 are stored for removal in hopper 289. The outlet stream from solids collector 287 is fed into blower 291 through a line 302. From blower 291 the flow is conducted into separator 285 for recirculation through a duct 301 which serves as an outlet for blower 290 and a tangential inlet for separator 285.

Figure 12:
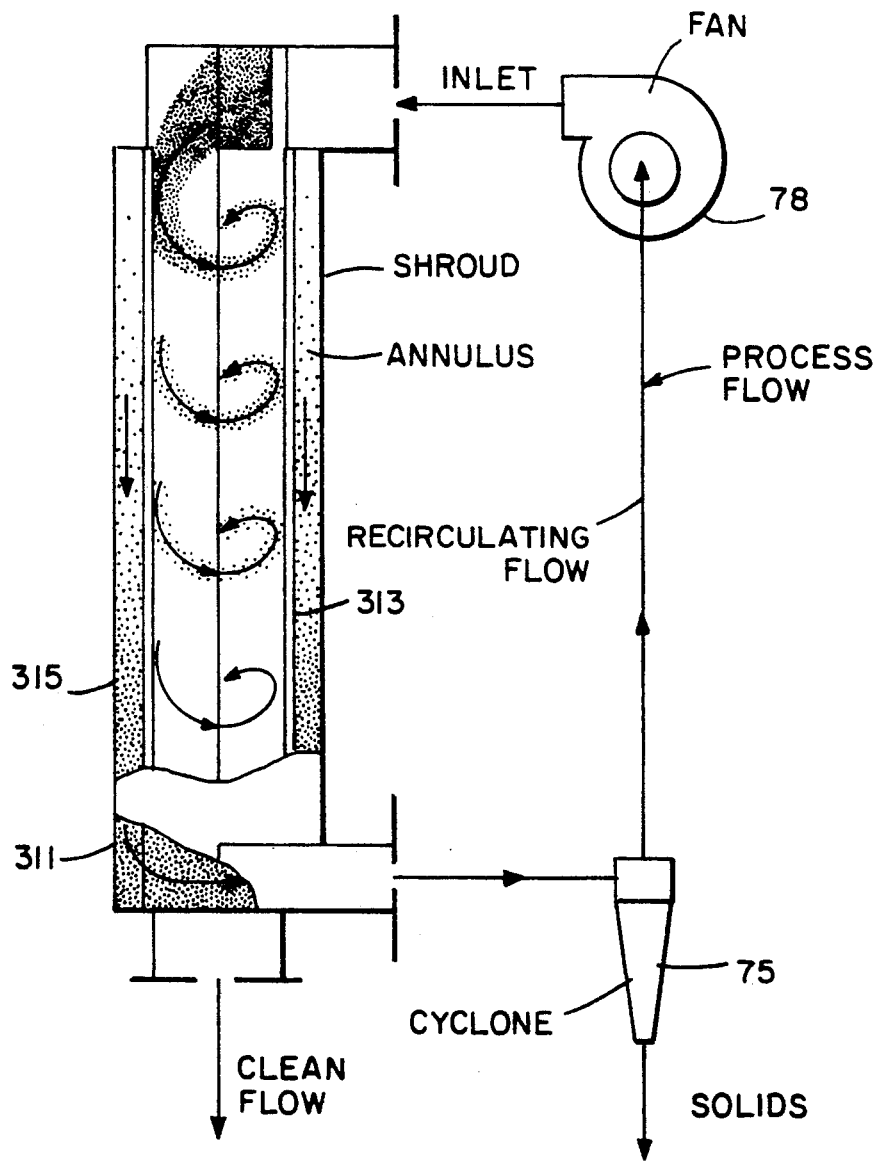
FIG. 12 is a schematic view of another embodiment of the invention.

In another embodiment of the invention, shown in FIG. 12, the separator 311 is a cylindrically shaped vessel having a side wall 313 of permeable material or impermeable material with at least one slit and is disposed inside another cylindrical shaped vessel 315 of impermeable material.

The embodiments of the present invention are intended to be merely exemplary and those skilled in the art shall be able to make numerous variation and modifications to it without departing from the spirit of the present invention. All such variations and modifications are intended to be within the scope of the present invention as defined in the appended claims.

What is claimed is:

1. Apparatus constructed and arranged for removing solid particulates from a solid particulate-laden fluid stream comprising:
   a. a centrifugal separator arranged for splitting the solid particulate-laden fluid stream into a clean fluid stream and a concentrated solid particulate-laden fluid stream, said centrifugal separator being cylindrically shaped and having a tangential inlet, and axial outlet and a sidewall, said solid particulate-laden fluid stream entering said centrifugal separator through said tangential inlet, said clean fluid stream exiting said centrifugal separator through said axial outlet, said sidewall being constructed to provide an outlet to enable passage through of said concentrated solid particulate-laden fluid stream, said centrifugal separator having no conical parts, no surfaces normal to the centrifugal separator axis in immediate proximity to the axial outlet and no means for producing flow U-turns within said centrifugal separator,
   b. a solids collector separate from the centrifugal separator and arranged for receiving the concentrated solid particulate-laden fluid streams from said centrifugal separator, extracting solid particulates therefrom and producing as a result thereof a fluid stream having a reduced solid particulate content, and
   c. means for mixing said fluid stream having a reduced solid particulate content back with said particulate-laden fluid stream upstream of said centrifugal separator, said means including an ejector.

2. The apparatus of claim 1 and wherein the ejector includes an axial inlet for receiving the fluid stream having a reduced solid particulate content, a tangential inlet for receiving the solid particulate laden fluid stream and a tangential outlet.

3. The apparatus of claim 1 and wherein the centrifugal separator, the solids collector and the ejector are all disposed along a common axis.

4. The apparatus of claim 1 and wherein the sidewall of the centrifugal separator is made of permeable material to enable passage of said concentrated solid particulate-laden fluid stream.

5. The apparatus of claim 1 and wherein the tangential outlet and said tangential inlet are at opposite ends of said centrifugal separator and the axis outlet has an entrance end that is spaced away from the tangential outlet.

6. The apparatus of claim 1 and wherein said outlet in said sidewall comprises an opening.

7. The apparatus of claim 6 and wherein the opening is in the form of a longitudinal slit.

8. The apparatus of claim 1 and wherein the centrifugal separator includes a pair of end walls and wherein the tangential inlet and the axial outlet are at opposite ends of the vessel and wherein the outlet for the clean fluid stream has an entrance end and an exit end and wherein said entrance end is spaced away from the end walls of said centrifugal separator.

9. The apparatus of claim 1 and wherein the ejector and the centrifugal separator are combined in one vessel.

10. Apparatus constructed and arranged for removing solid particulates from a solid particulate-laden fluid stream comprising:
  a. a centrifugal separator arranged for splitting the solid particulate-laden fluid stream into a clean fluid stream and a concentrated solid particulate-laden fluid stream, said centrifugal separator being cylindrically shaped and having a tangential inlet, an axial outlet and a sidewall, said solid particulate-laden fluid stream entering said centrifugal separator through said tangential inlet, said clean fluid stream exiting said centrifugal separator through said axial outlet, said sidewall being constructed to provide an outlet to enable passage through of said concentrated solid particulate-laden fluid stream, said centrifugal separator having no conical parts, no surfaces normal to the centrifugal separator axis in immediate proximity to the axial outlet and no means for producing flow U-turns within said centrifugal separator,
  b. a solids collector separate from the centrifugal separator and arranged for receiving the concentrated solid particulate-laden fluid streams from said centrifugal separator, extracting solid particulates therefrom and producing as a result thereof a fluid stream having a reduced solid particulate content, and
  c. means for mixing said fluid stream having a reduced solid particulate content back with said solid particulate-laden fluid stream upstream of said centrifugal separator, said means including a blower or a fan.

11. The apparatus of claim 10 and further including another centrifugal separator, the two centrifugal separators being identical in construction and being coupled together in series.

12. The apparatus of claim 10 and wherein the centrifugal separator includes another tangential outlet and another axial outlet.

13. Apparatus constructed and arranged for removing solid particulates from a solid particulate-laden fluid stream comprising:
  a. a centrifugal separator arranged for splitting the solid particulate-laden fluid stream into a clean fluid stream and a concentrated solid particulate-laden fluid stream, said centrifugal separator being cylindrically shaped and having a tangential inlet, an axial outlet and a sidewall, said solid particulate-laden fluid stream entering said centrifugal separator through said tangential inlet, said clean fluid stream exiting said centrifugal separator through said axial outlet, said sidewall being constructed to provide an outlet to enable passage through of said concentrated solid particulate-laden fluid stream, said centrifugal separator having no conical parts, no surfaces normal to the centrifugal separator axis in immediate proximity to the axial outlet and no means for producing flow U-turns within said centrifugal separator.
  b. a cyclonic type solids collector separate from the centrifugal separator and arranged for receiving the concentrated solid particulate-laden fluid streams from said centrifugal separator, extracting solid particulates therefrom and producing as a result thereof a fluid stream having a reduced solid particulate content, and
  c. means for mixing said fluid stream having a reduced solid particulate content back with said solid particulate-laden fluid stream upstream of said centrifugal separator.

14. The apparatus of claim 13 and wherein the cyclonic type solids collector has a tangential inlet for receiving the concentrated solid particulate-laden fluid stream.

15. Apparatus constructed and arranged for removing solid particulates from a solid particulate-laden fluid stream comprising:
  a. a centrifugal separator arranged for splitting the solid particulate-laden fluid stream into a clean fluid stream and a concentrated solid particulate-laden fluid stream, said centrifugal separator being cylindrically shaped and having a tangential inlet, an axial outlet and a sidewall, said solid particulate-laden fluid stream entering said centrifugal separator through said tangential inlet, said clean fluid stream exiting said centrifugal separator through said axial outlet, said sidewall being constructed to provide a slit along its length to enable passage through of said concentrated solid particulate-laden fluid stream, said centrifugal separator having no conical parts, no surfaces normal to the centrifugal separator axis in immediate proximity to the axial outlet and no means for producing flow U-turns within said centrifugal separator, pg,34
  b. a cyclonic type solids collector separate from the centrifugal separator and arranged for receiving the concentrated solid particulate-laden fluid streams from said centrifugal separator, extracting solid particulates therefrom and producing as a result thereof a fluid stream having a reduced solid particulate content, said cyclonic type solids collector having a sidewall, said sidewall having a slit in communication with said slit in said centrifugal separator for receiving said concentrated solid-particulate laden fluid stream from said centrifugal separator, and
  c. means for mixing said fluid stream having a reduced solid particulate content back with said solid particulate-laden fluid stream upstream of said centrifugal separator, said means including a blower or a fan.

* * * * *